United States Patent
Asakura

[19]

[11] Patent Number: 5,805,946
[45] Date of Patent: Sep. 8, 1998

[54] CAMERA HAVING AN IMAGE FRAME AND A CARTRIDGE CHAMBER SEPARATED BY A DISTANCE TO PREVENT FILM SUBJECTED TO FORCES IN A WIDTH DIRECTION FROM DEGRADING A FOCUS OF AN IMAGE ON THE FILM

[75] Inventor: Yasuo Asakura, Hachioji, Japan

[73] Assignee: Olympus Optical Co., Ltd., Tokyo, Japan

[21] Appl. No.: 654,183

[22] Filed: May 28, 1996

[30] Foreign Application Priority Data

Jun. 1, 1995 [JP] Japan ................................. 7-134881

[51] Int. Cl.$^6$ .................................................. G03B 17/00
[52] U.S. Cl. ................................................................ 396/440
[58] Field of Search ..................................... 396/439, 440, 396/535, 511, 512, 516

[56] References Cited

U.S. PATENT DOCUMENTS 5,251,840  10/1993  Niedospial .
5,384,613   1/1995  Cloutier et al. ...................... 396/535 X

FOREIGN PATENT DOCUMENTS

5-45801   2/1993   Japan .

Primary Examiner—David M. Gray
Assistant Examiner—J. K. Han
Attorney, Agent, or Firm—Louis Weinstein

[57] ABSTRACT

A camera using a photographic film accommodated in a cartridge main body in the state that a cartridge is loaded into the camera, the film being pressed, when it is fed out to the outside of the cartridge, by being subjected to a load in a film width direction substantially at a given position in the cartridge, wherein the position of the cartridge is set with respect to the position of the photographing opening of the camera so that the portions of the photographic film subjected to the load in the cartridge are located in the vicinity of the interval between photographing frame of the film fed out. According to the above arrangement of the camera, even if the fed photographing film is subjected to the load, it can maintain good flatness at the portion thereof corresponding to the photographing opening and an out of focus condition due to increased film curvature can be prevented.

6 Claims, 5 Drawing Sheets

CAMERA HAVING AN IMAGE FRAME AND A CARTRIDGE CHAMBER SEPARATED BY A DISTANCE TO PREVENT FILM SUBJECTED TO FORCES IN A WIDTH DIRECTION FROM DEGRADING A FOCUS OF AN IMAGE ON THE FILM

BACKGROUND OF THE INVENTION

1. Field of the Invention

The present invention relates to a camera, and more specifically, to a camera to which is applied a film feeding out type photographic film cartridge having a structure for preventing the looseness of a wound film.

2. Related Art Statement

Conventionally, U.S. Pat. No. 5,251,840 and Japanese Patent Application Laid-Open No. 5-45801 propose a photographic film cartridge capable of feeding out a photographic film accommodated in a cartridge when the cartridge is loaded into a camera.

The conventional photographic film cartridge is arranged such that flanges composed of a flexible material loosely engage opposite ends of the spool in a cartridge around which a photographic film is wound. The outermost periphery of the photographic film wound around the spool is partially wrapped in the projections of annular tongue pieces formed in the peripheral edges of the flanges so that the wound photographic film is prevented from being loosened. When the spool is rotated in a photographic film feeding direction, the film is rotated integrally with the spool without being loosened and fed to the outside thereby expanding the projections in the width direction of the film in the vicinity of the film in/out port of the cartridge of a cartridge main body.

The detailed structure of the above conventional film cartridge and film feed operation will be described below with reference to a cross sectional view of a cartridge shown in FIG. 4 and a view of a film feed passage shown in FIG. 5 when a camera is observed from the rear side thereof while it is feeding a film.

Figure 4:
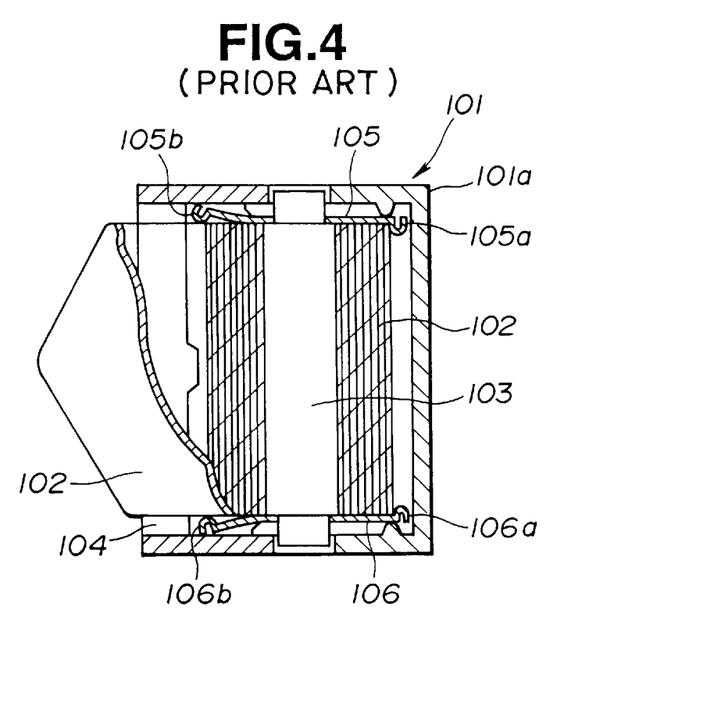
FIG. 4 is a longitudinal cross sectional view of a conventional feed out type photographic film cartridge.

As shown in FIG. 4, a photographic film 102 is accommodated in a cartridge 101 in the state that it is wound around a spool 103 in a cartridge main body 101*a*. Flanges 105, 106 composed of a flexible material loosely engage opposite ends of the spool 103 in the cartridge and annular projections 105*a*, 106*a* integrally formed along the outer peripheral edges of the flanges 105, 106, prevent the looseness of the wound film 102.

Figure 5:
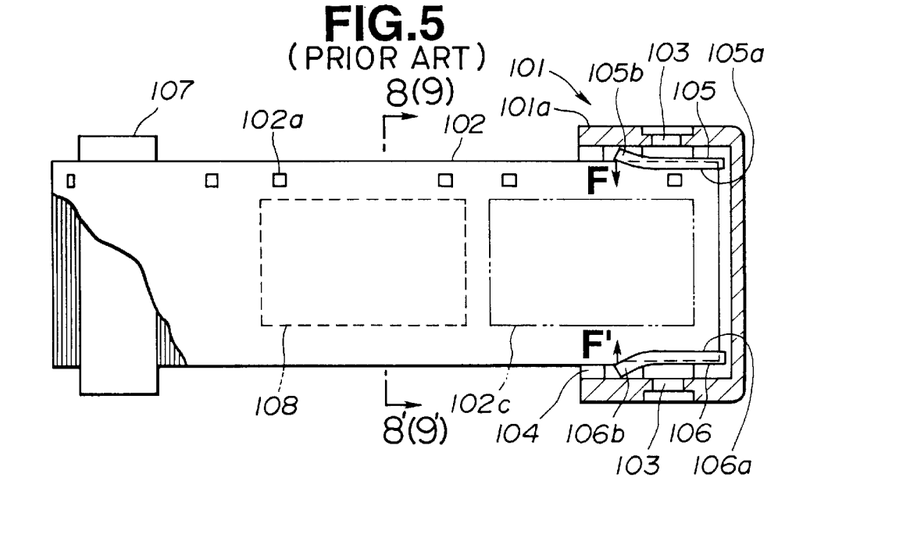
FIG. 5 is a view showing a film feed passage of a conventional camera to which the photographic film cartridge of FIG. 4 is applied when a film feed state is observed from the rear side of the camera.

As shown in FIG. 5, the film 102 fed out to a camera side from the cartridge 101 arranged as described above passes through behind the photographing opening 108 of the camera and is wound around a camera side spool 107. At the time of feeding, the flanges 105, 106 are elastically deformed and expanded at the annular projections 105*a*, 106*a* in the film width direction by the film 102 in the vicinity of a film in/out port 104. Flanges 105*a*, 106*a* apply pressure forces F and F' to the film as described above. The deformed portions are denoted by numerals 105*b*, 106*b*. Further, perforations 102*a* are aligned adjacent to an edge of the film 102 in the width direction thereof at predetermined intervals.

When the aforesaid conventional photographic film cartridge 101 is mounted in a camera, the film 102 is subjected to the pressure forces F and F' caused by the elastic deformation of the flanges 105, 106 in the vicinity of the film in/out port 104 of the cartridge as described above. When the camera is left in this state for a long time, the film 102 is deformed by the pressure forces F and F' applied thereto for a long time and cannot be restored from the deformation in a short time.

Figure 6:
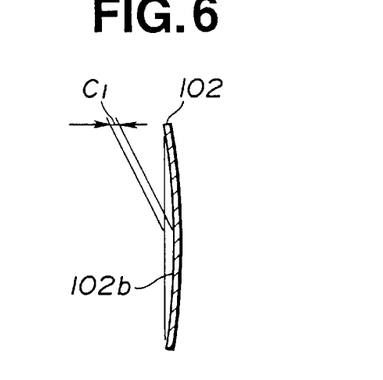
FIG. 6 is a view showing a curled state of a conventional film which has not experienced a pressure force in the width direction for a long time, said view showing a cross section of the film in the width direction thereof.
Figure 7:
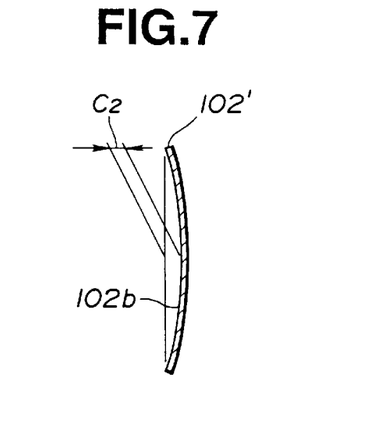
FIG. 7 is a view showing the curled state of the conventional film after it is subjected to a pressure force in the width direction for a long time said view showing a cross section of the film in the width direction.

FIG. 6 and FIG. 7 are views showing the cross section of the film in the width direction thereof, wherein FIG. 6 shows a cross section of the film 102 in a usual curling state without being subjected to the pressure forces F, F' and FIG. 7 shows the curled state of a film 102' after it is subjected to the pressure forces F, F' of FIG. 5 for a long time.

The emulsion coated surface of the photographic films, 102, 102' is denoted by numeral 102*b* in FIG. 6 and FIG. 7, the photographic film 102 generally has a curling characteristic that the emulsion coated surface 102*b* side assumes a concave shape and an amount of curling $C_1$ in the usually deformed state is within a predetermined range as shown in FIG. 6. As shown in FIG. 7, however, the portion of the film 102' which has been subjected to the pressure forces F, F' for a long time undergoes an amount of curling $C_2$ which exceeds the above predetermined range. The emulsion coated side 102*b* of the film 102' also assumes a concave shape.

Figure 8:
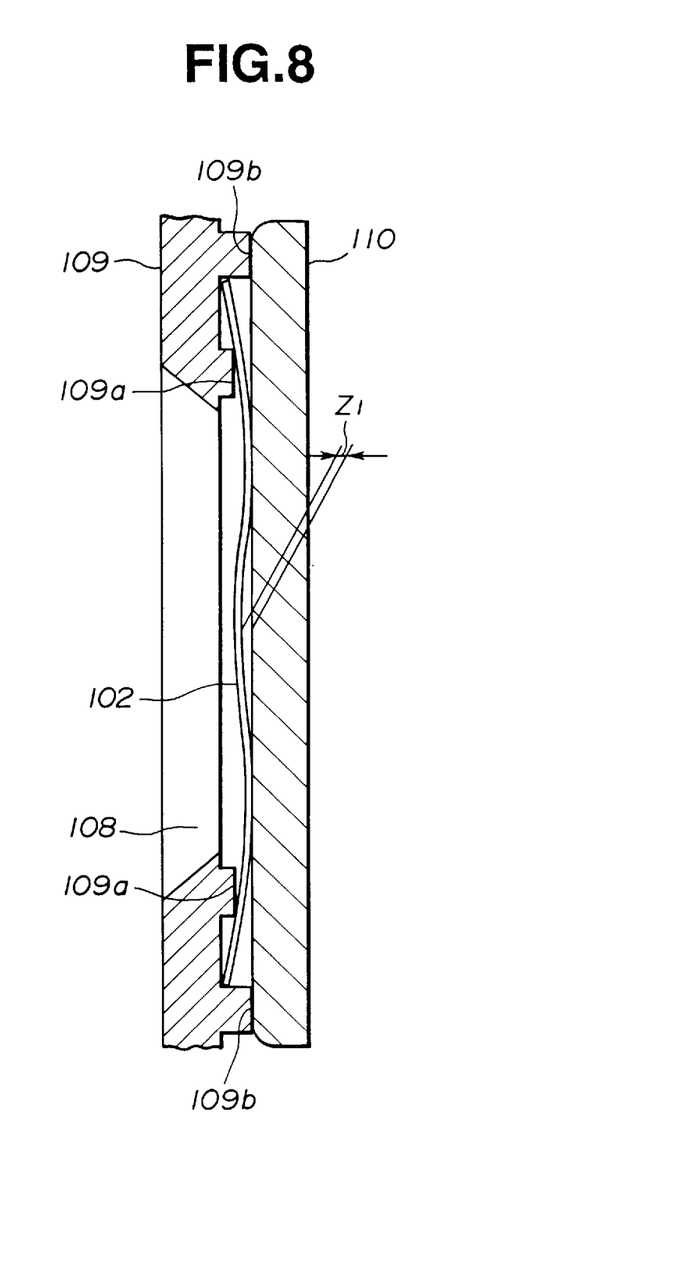
FIG. 8 is a view showing a cross section of the film of FIG. 6 in the region of an aperture when the film in the usual state is fed by the conventional camera shown in FIG. 5.
Figure 9:
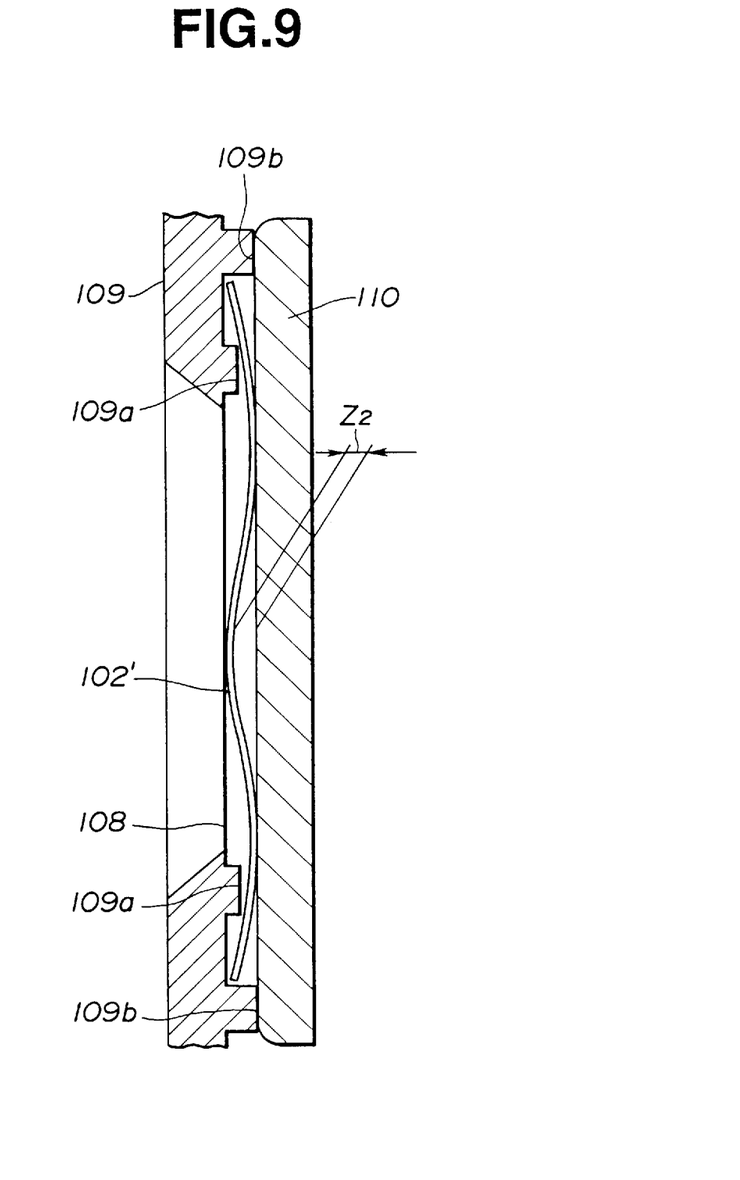
FIG. 9 is a view showing a cross section of the film of FIG. 7 on the aperture when the film in the deformed state is fed by the conventional camera shown in FIG. 5.

FIG. 8 and FIG. 9 are views showing the cross section 8 (9) 8' (9') of an aperture in FIG. 5, wherein FIG. 8 is a cross sectional view showing the state when the film 102 is fed in the usually deformed state shown in FIG. 6, the portion of the film 102 around the photographing opening 108 is corrected (i.e. flattened) by a pressure plate 110. Further, FIG. 9 shows the state when the film 102' is wound up a frame after the camera is left for a long time and the portion of the next frame 102*c* of the film 102' (refer to FIG. 5) deformed by being subjected to the above pressure force reaches the photographing opening 108, the deformed portion of the film 102' around the photographing opening 108 is corrected (i.e. flattened) by the pressure plate 110.

As shown in FIG. 8 and FIG. 9, a pair of known film rail surfaces 109*a* and a pair of known pressure plate rail frames 109*b* are disposed above and below the photographing opening 108 provided in camera main body 109 and the pressure plate 110 is maintained in pressure contact with the pressure plate rail surfaces 109*b*.

The back surface of film 102 in the usual state shown in FIG. 6 is substantially in contact with the pressure plate 110 in the region of the photographing opening so that the film retains a flat state relatively well. Even if the film 102 floats from the pressure plate 110 due to the dispersion of the film 102 and the deformation thereof caused by the change of the environment in which the film is used, a floating amount $Z_1$ is specifically set within the range of about 0.02 mm or less as shown in FIG. 8.

However, when the film 102' is subjected to the pressure forces F, F' for a long time and the curled portion thereof deformed by a large amount is corrected by being pressed by the pressure plate 110, curling at the center of the film is reversed and the film 102' greatly projects by a significant amount toward the forward direction of the camera from the pressure plate 110 as shown in FIG. 9. A specific example will be described as follows. When the pressure forces F, F' are set to about 30 gf and the film 102 composed of polyethylene terephthalate of about 0.09 mm thick is employed as a film base material is left in this state for 24 hours, a floating amount $Z_2$ at the center of the film subjected to the above pressure forces is about 0.03–0.10 mm just after the film is wound up a frame. When a photograph is taken in this state, there is caused a disadvantage that a photograph out of focus is taken because the light sensitive surface of the film is greatly dislocated from the image forming surface of a lens in an optical axis direction at the center of an image.

OBJECT AND SUMMARY OF THE INVENTION

An object of the present invention is to provide a camera capable of photographing a picture without causing an out of focus condition with a lesser amount of effect on a photographing film due to the deformation of the film even if the film is left in the camera for a long time to which a feeding out type photographic film cartridge is applied in which pressure forces act on the film in a width direction.

The camera according to the present invention using a photographic film accommodated in a cartridge main body in the state that a cartridge is loaded into the camera is arranged such that the film is pressed, when it is fed out to the outside of the cartridge, by being subjected to a load in a film width direction substantially at a given position in the cartridge, wherein the position of the cartridge is set with respect to the position of the photographing opening of the camera so that the portions of the photographic film subjected to the load in the cartridge is located in the vicinity of the interval between photographing drames of the film fed out. According to a camera having this design, even if the fed photographic film is subjected to such a load, it can maintain a good flatness at the portion thereof corresponding to the photographing opening and an out of focus condition can be prevented. Thus, good flatness of the photographic film can be secured at the portion thereof corresponding to the photographing opening.

Other features and advantages of the present invention will be apparent from the following description.

DESCRIPTION OF PREFERRED EMBODIMENTS

Embodiments of the present invention will be described with reference to the drawings.

Figure 1:
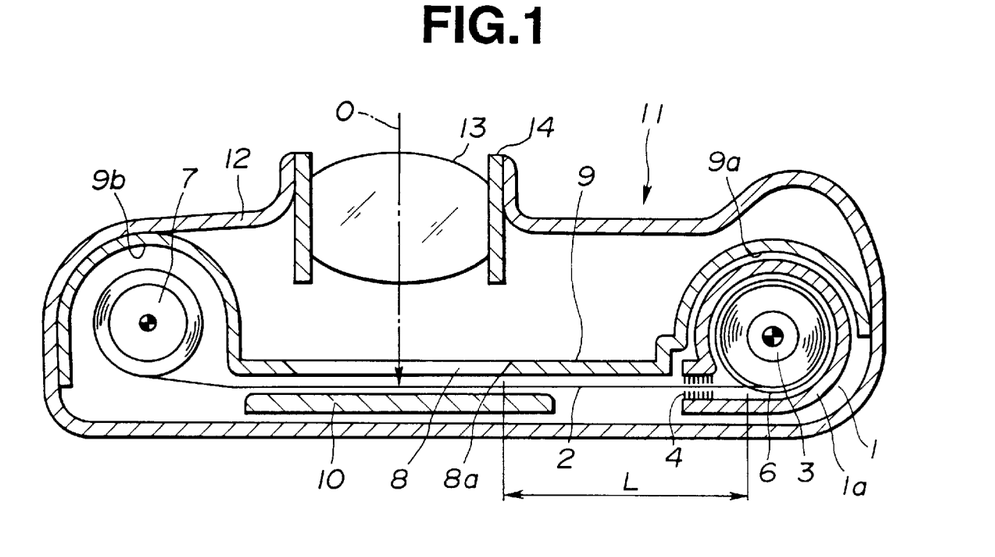
FIG. 1 is a lateral cross sectional view of a camera showing a first embodiment of the present invention.
Figure 2:
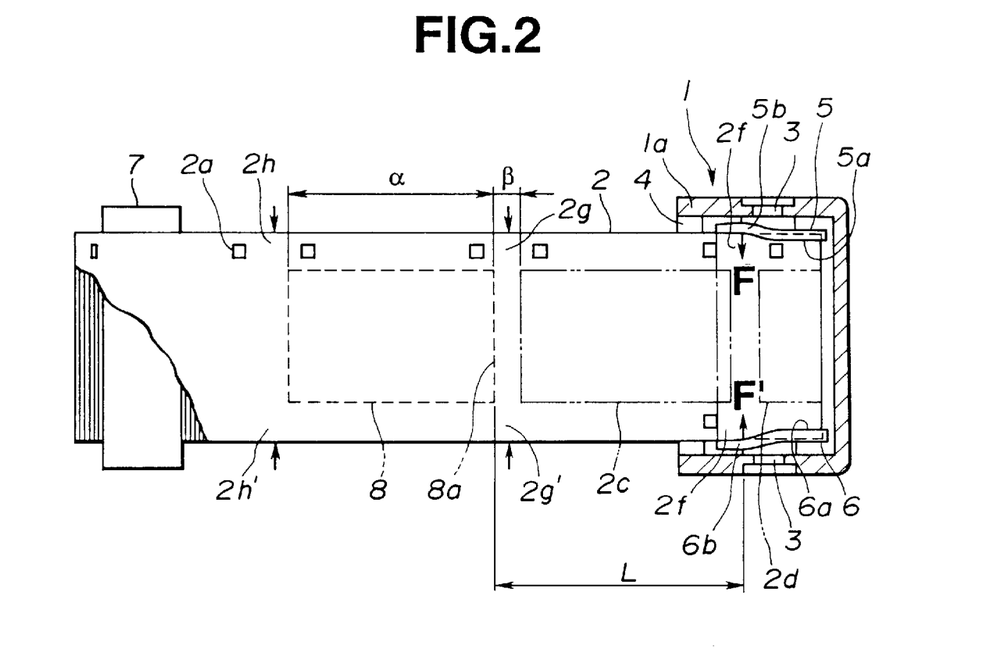
FIG. 2 is a view showing a film feed passage of the camera of FIG. 1 when a film feeding state is observed from the rear side of the camera.

FIG. 1 is a lateral cross sectional view of a camera shown in a first embodiment of the present invention viewed from the upper side thereof and FIG. 2 is a view showing a film feed passage when the camera in a film feeding state is observed from the rear side thereof.

A camera 11 is arranged such that a camera main body 9 supporting a photographing lens 13 through a lens barrel 14 includes a cartridge chamber 9a capable of accommodating a photographic film cartridge 1 located on a right side and a spool chamber 9b having a film winding spool 7 disposed therein located on a left side. Further, a photographing opening 8 is disposed in confrontation with the photographing lens. A pressure plate 10 is disposed in confrontation with the photographing opening 8. The above camera main body 9 and the like are accommodated in an outside cover body 12.

The photographic film cartridge 1 has such a structure that after the cartridge 1 is loaded into the camera, a photographic film 2 can be fed out from the cartridge 1 by rotating a spool 3 in the cartridge and wound by the camera side spool 7. The cartridge 1 has a mechanism for preventing looseness of wound film similar to that of the conventional cartridge 101 described in FIG. 4.

That is, the photographic film 2 of the above photographic film cartridge 1 is wound around the spool 3 in the cartridge in the state that the cartridge is loaded into the camera and accommodated in a cartridge main body 1a. Flanges 5, 6 composed of a flexible material are loosely engaged with both the ends of the spool 3 in the cartridge and integral annular projections 5a, 6a are formed along the outer peripheral edge of the flanges 5, 6 to prevent the looseness of the wound film 2.

The film 2 fed from the inside of the cartridge to the camera side passes behind the photographing opening 8 of the camera and is wound around the camera side spool 7. At such time, the flanges 5, 6 are elastically deformed and expanded by the film 2 in a film width direction at the annular projections 5a, 6a in the vicinity of the film in/out port 4 of the cartridge case 1a. The flange deformed portions 5b, 6b of the flanges cause the portions 2f, 2f' of the film to be subjected to pressure forces F, F' in the film width direction, that is the portions 2f, 2f' serve as pressure force acting portions.

Perforations 2a are arranged along an edge of the film 2 in the width direction thereof at predetermined intervals.

In the camera 11 of the embodiment, when the film 2 is fed frame by frame, a next frame 2c and a frame 2d following the frame 2c are sequentially fed to the position of the photographing opening 8. At such time, the cartridge 1 is disposed with respect to the position where the photographing opening 8 is disposed so that the pressure force acting portions 2f, 2f' of the photographing film 2 which are pressed in a photographing standby state are located at the intermediate positions 2g, 2g' and 2h and 2h' of the intervals between frames and the position of the cartridge chamber 9a of the camera main body 9 is set in correspondence to the above disposition.

A photographic film feed passage L extending from the cartridge side end surface 8a of the photographing opening 8 to the portions 2f, 2f' where the photographic film on the cartridge is pressed has a length determined by $$L = \alpha + (3/2) \times \beta \tag{1}$$

where, a width of the photographing opening 8 in a photographic film feed direction is α, and a size of an interval between frames of the photographic film is β. However, it suffices only to determine the position of the cartridge so as to satisfy the following formula (2), taking a positional dislocation caused to the deformed portion of the film to some degree into consideration.

$$(\alpha+\beta) \leq L \leq (\alpha+2\times\beta) \qquad (2)$$

When the film 2 is left for a long time in the camera 11 of the embodiment arranged as described above, the film 2 is locally curled at the portions 2f, 2f' by the pressure forces F, F'. However, when one frame of the film is wound up thereafter for photographing, the pressure force acting portions 2f, 2f' of the film on which the pressure forces F, F' act are moved to the intermediate positions 2g, 2g' of the interval β of the photographing frame outside of the cartridge side end surface 8a on the right side thereof, so that the pressure force acting portions 2f, 2f' do not lie over the photographing opening 8. Further, when one frame of the film is additionally wound up, the pressure force acting portions 2f, 2f' of the film are moved to the positions 2h, 2h' of the interval of the frame outside of the photographing opening 8 on the left side thereof. Therefore, the photographing surface of the film 2 which confronts the photographing opening 8 is a portion thereof which is less deformed; thus the affects of the photographing surface on a focusing surface is reduced.

As described above, according to the camera 11 of the embodiment, even if a film is left for a long time in the camera and deformed by the aforesaid pressures in the width direction thereof, since the pressure force acting portions 2f, 2f' of the film 2 do not locate on an image photographing surface confronting the photographing opening 8 when frames are fed one by one as described above, the film is not greatly floated from the pressure plate 10 on the photographing surface thereof as shown in FIG. 9. As a result, the film located at the position confronting the photographing opening 8 is kept in a substantially good flat state and thus the film can take a photograph focused in a good state over the entire area of a photographed image surface.

Note, there is a possibility that the positions of the film on which the pressure forces F, F' act are relatively dislocated a small amount with respect to a film feed direction due to the difference of the number of photographing frames, the difference of the size of a film between, for example, a second frame and a thirty six frame and the size of the inside of a cartridge and, for example, a type of a film, a difference of a film manufacturer and the like.

However, when the position of the cartridge is set with respect to the photographing opening 8 so that the pressure force acting portions 2f, 2f' of a film are located at a position between photographing frames, that is, at the portion of a frame interval each time a frame is fed, even if the film is differently moved and slightly dislocated as described above, the dislocation only appears as the dispersion of the positions of the pressure force acting portions 2f, 2f' serving as deformed portions along the peripheral edge of a photographed image surface. Therefore, the flatness of the photographed surface of a film is almost not degraded and photographing can be executed with only a small reduction in focusing accuracy.

Further, in a camera having a large f-number and a large depth of focus, even if the length of the film feed passage L is located outside of the range of the inequality formula (2) to some degree, no problem is caused by it so long as the portion of a film deformed by the pressure forces F, F' are located between photographing frames, that is, in the vicinity of an interval between photographing frames.

Figure 3:
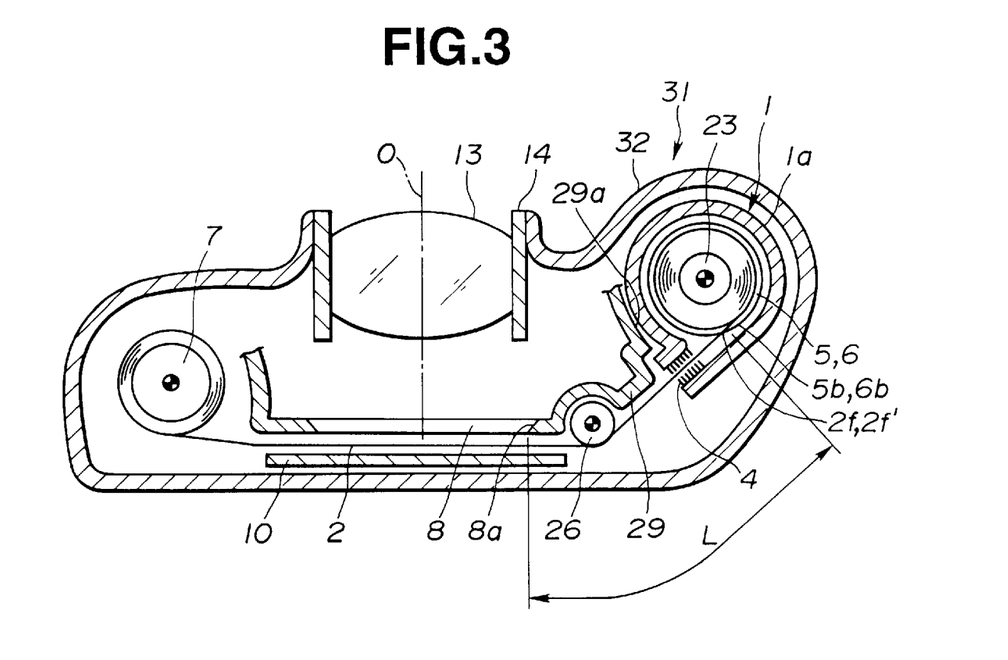
FIG. 3 is a lateral cross sectional view of a camera showing a second embodiment of the present invention.

Next, a camera of a second embodiment of the present invention will be described with reference to FIG. 3 showing a lateral cross sectional view of the camera when it is viewed from the upper side thereof.

Although a cartridge similar to the cartridge 1 applied to the camera of the embodiment of FIG. 1 is also applied to a camera 31 of the embodiment, the camera 31 is characterized in that it has a cartridge chamber 29a disposed in the outside cover body 32 of the camera and a grip located obliquely forward of a camera main body 29.

Note, the structure of the camera 31 except the above-mentioned structure is approximately the same as that of the camera of the first embodiment and the same numerals as used in FIG. 1 are also used to denote the same components. Further, a cartridge 1 also employs the same numerals as used in the first embodiment.

In the camera of the FIG. 3 embodiment, a film 2 taken out from the cartridge 1 loaded into the cartridge chamber 29a is guided around roller 26, to move in a direction perpendicular to a photographing optical axis 0 and is fed to a camera side spool 7.

A length of a photographic film feed passage L of the camera is set to the same size as that of the embodiment of FIG. 1. That is, the portions of the photographic film 2, against which the deformed portions 5b, 6b of the projections 5a, 6a of winding looseness preventing flanges 5, 6 loosely engaged with a spool 3 in the cartridge are abutted, are regarded as the pressure force acting portions 2f, 2f' of the photographic film 2 in the width direction thereof. The expanded length of the bent portion from the pressure force acting portions 2f, 2f' to the end surface 8a of a photographing opening 8 on the cartridge side thereof through the roller 26 is set as the length of the film feed passage L and the cartridge chamber 29a is set with respect to the photographing opening 8 so that the above formula (2) is satisfied.

Since the camera of the embodiment has the structure as described above, even if the pressure force acting portions 2f, 2f' of the film 2 is deformed by being subjected to the pressure forces of the flanges 5, 6 of the cartridge for a long time similar the above first embodiment, excellent flatness of the film 2 can be secured at least on the photographed image surface of the film 2 with respect to the photographing opening so that a photograph can be taken in the true focus of a lens over the entire photographed image surface.

Further, since the camera of the present invention employs the structure that the cartridge chamber 29a is located in the grip obliquely forward of the camera, the ease of holding the camera is improved as well as reducing the size of the camera.

What is claimed is:

1. A camera using a photographic film cartridge arranged such that when a photographic film accommodated in a cartridge main body is fed out when the cartridge is loaded into a cartridge chamber of the camera, longitudinal edges of the film are pressed toward one another by forces acting in a film width direction substantially at a given position in the cartridge, wherein the cartridge chamber is spaced from a position of a near end of a photographing opening of said camera to provide a separation distance between said given position and said photographing opening so that portions of the photographic film at said given position and subjected to said forces are located within an interval between adjacent photographing frames of images formed on the film fed out of the cartridge so that said given position of said film edges are displaced from said photographing opening when a portion of a film for forming a next image frame and which is adjacent to said given position is aligned with said photographing opening.

2. A camera according to claim 1, wherein the position of said cartridge is spaced with respect to the position of the near end of said photographing opening so as to satisfy conditions for establishing the following relationship $$(\alpha+\beta) \leq L \leq (\alpha+2\times\beta) \qquad (2)$$

where, L is a length of a photographic film feed path measured from the near end of the photographing opening of said camera in the cartridge side direction thereof to the pressed in portions of said photographic film, $\alpha$ is a width of said photographing opening in a photographic film feed direction; and $\beta$ is a length of an interval between photographing frames of said photographic film measured in the film feed direction.

3. A camera according to claim 1 further including a roller 26 positioned in a region between said cartridge chamber and the near end of said photographing opening and being rollingly engaged by said film as the film passes toward said photographing opening whereby said film moves in a first given direction between said cartridge chamber and said roller and bends about said roller to move in a second direction along a path extending between said roller and said photographing opening.

4. A camera according to claim 3 wherein said roller is mounted to rotate about an axis substantially perpendicular to a direction of movement of said film.

5. A camera according to claim 1 further including a guide member positioned in a region between said cartridge chamber and the near end of said photographing opening and being rollingly engaged by said film as the film passes toward said photographing opening whereby said film moves in a first given direction between said cartridge chamber and said guide member and bends about said guide member to move in a second direction along a path extending between said guide member and said photographing opening; and said path between said cartridge chamber and said guide member being diagonal to a planar passageway adjacent to said photographing opening and said path between said guide member and said photographing opening being parallel to said planar passageway.

6. A camera having a photographing opening defining an image plane for an image to be photographed;

a cartridge chamber in said camera arranged to one side of said photographing opening;

a take-up chamber in said camera arranged along a side of said photographing opening opposite said cartridge chamber for taking up a film delivered thereto;

a film cartridge arranged in said cartridge chamber;

said film cartridge having a cartridge main body, a cartridge spool rotatably mounted within said cartridge main body, a photographic film wound about said cartridge spool;

flexible flanges disposed at opposite ends of said cartridge main body and having integral annular projections enclosing outer edges of the film to prevent the film wound about said cartridge spool from becoming loose;

said annular projections being flexible and moving outwardly and away from the longitudinal edges of the film as it is fed out of an in/out port of said cartridge main body, said projections exerting forces at given positions along the opposite longitudinal edges of said film pressing said edges inwardly at said given positions;

said cartridge chamber being spaced from a near-end of said photographing opening so that the given positions along the opposite longitudinal edges of the photographic film by said flexible projections and which are located within an interval between adjacent photographing frames formed on the film are displaced from said photographing opening when a portion of a film for forming a next image frame adjacent said given positions along the longitudinal edges of said film is aligned with said photographing opening.

\* \* \* \* \*

UNITED STATES PATENT AND TRADEMARK OFFICE
CERTIFICATE OF CORRECTION

PATENT NO.  : 5,805,946
DATED       : September 8, 1998
INVENTOR(S) : Asakura

It is certified that error appears in the above-identified patent and that said Letters Patent is hereby corrected as shown below:

Col. 2, line 56, delete "greatly".

Col. 2, line 56, before "reversed" insert --greatly--.

Col. 3, line 22, delete "drames" and insert instead --frames--.

Col. 7, line 1, after "claim 1" insert --or claim 2--.

Signed and Sealed this

Twenty-eighth Day of September, 1999

Attest:

Q. TODD DICKINSON

*Attesting Officer*      *Acting Commissioner of Patents and Trademarks*